United States Patent Office 3,712,915
Patented Jan. 23, 1973

1

3,712,915
INDANYL-N-METHYL-CARBAMIC ACID ESTERS
Alfred Seyberlich, Cologne-Stammheim, Ingeborg Hammann, Cologne, and Wolfgang Behrenz, Cologne-Stammheim, Germany, assignors to Farbenfabriken Bayer Aktiengesellschaft, Leverkusen, Germany
No Drawing. Filed May 23, 1969, Ser. No. 827,155
Claims priority, application Germany, May 25, 1968,
P 17 68 555.1
Int. Cl. C07c 125/06
U.S. Cl. 260—479 C   3 Claims

ABSTRACT OF THE DISCLOSURE

Indanyl-N-methyl-carbamic acid esters, i.e. 2-alkyl-(optionally 1-, 2- and /or 7- monoto tetra-alkyl substituted)-indan-4-yl-N-methyl-carbamic acid esters and 7-alkyl-indan-4-yl-N-methyl carbamic acid esters, which possess arthropodicidal, especially acaricidal and insecticidal, properties and which may be produced by conventional methods.

The present invention relates to and has for its objects the provision for particular new indanyl-N-methyl-carbamic acid esters, i.e. 2-alkyl-(optionally 1-, 2- and/or 7- mono to tetra-alkyl substituted)-indan-4-yl-N-methyl-carbamic acid esters and 7-alkyl-indan-4-yl-N-methyl carbamic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is known that indan-4-yl-N-methyl-carbamic acid esters, for example 1,1-dimethyl-indan-4-yl-N-methyl-carbamic acid ester (A) [see German Published Patent 1,249,261], are insecticidally and acaricidally active. These known compounds have proved to be extremely effective insecticides.

It has now been found, in accordance with the present invention, that the particular new indanyl-N-methyl-carbamic acid esters of the formula

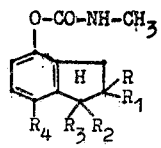

(I)

in which

R is alkyl of 1–4 carbon atoms, and
$R_1$, $R_2$, $R_3$ and $R_4$, each individually, is alkyl of 1–4 carbon atoms, or hydrogen;
or
$R_4$ is alkyl of 1–4 carbon atoms, while
R, $R_1$, $R_2$ and $R_3$ are all hydrogen,

2 exhibit strong arthropodicidal, especially insecticidal and acaricidal, properties.

It has been furthermore found, in accordance with the present invention, that a process for the production of the indan-yl-N-methyl-carbamic acid esters of Formula I above may now be provided which comprises reacting a 4-hydroxy-indane of the formula

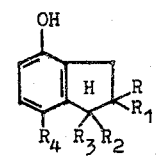

(II)

in which R to $R_4$ are the same as defined above, with methylisocyanate (III).

Advantageously, the particular new active compounds of the present invention exhibit a surprisingly high insecticidal and acaricidal activity and are superior to the previously known chemically similar insecticides. Especially surprising is the broad range of effectiveness and the high stability to alkali of the instant compounds. The new compounds of the present invention therefore represent a valuable enrichment of the art.

The course of the production process of the present invention proceeds in accordance with the following reaction scheme:

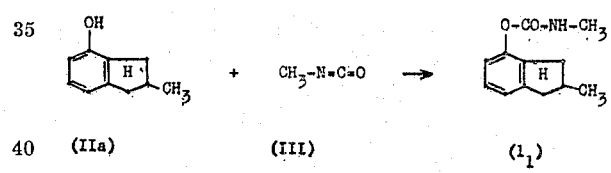

(IIa)         (III)         ($I_1$)

Advantageously, in accordance with the present invention, in the various formulae herein:

R represents straight and branched chain lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl; and $R_1$, $R_2$, $R_3$ and $R_4$, each individually, represents (i.e. same or different) hydrogen; or straight and branched chain lower alkyl of 1–4 carbon atoms such as methyl to tert.-butyl inclusive as defined above, and the like, especially $C_{1-3}$ or $C_{1-2}$ alkyl, and more especially methyl; or $R_4$ represents straight and branched chain lower alkyl of 1–4 carbon atoms such as methyl to tert.-butyl inclusive as defined above, and the like, especially $C_{1-3}$ or $C_{1-2}$ alkyl, and more especially methyl; while R, $R_1$, $R_2$ and $R_3$ are all simultaneously hydrogen.

Thus, R, $R_1$, $R_2$, $R_3$ and $R_4$ are $C_{1-4}$ alkyl or hydrogen, with the proviso that when R is $C_{1-4}$ alkyl, $R_1$, $R_2$, $R_3$ and $R_4$, each individually, is hydrogen or $C_{1-4}$ alkyl, whereas when R is hydrogen, $R_4$ is $C_{1-4}$ alkyl and $R_1$, $R_2$ and $R_3$ are all hydrogen.

The production reaction can be carried out in inert solvents. Suitable for this purpose are for example hydrocarbons, such as benzine and benzene; chlorinated hydrocarbons, such as chlorobenzene; or ethers, such as dioxan; or mixtures of these solvents; and the like. It is, however, also possible to react the components directly in the absence of solvents.

The reaction is catalyzed by the addition of a tertiary amine, for example triethylamine or diazabicyclooctane.

The reaction temperature can be varied within a fairly wide range. In general, however, the reaction is carried out at substantially between about 0–150° C.

Of the 4-hydroxy-indanes of Formula II above, usable as starting materials, some are already known. The known processes for their preparation can be utilized for the unknown starting materials, so that all the 4-hydroxy-indanes usable are obtainable in simple manner.

2-methyl-indanole-(4) and 7-methyl-indanole-(4), i.e. 2-methyl-indan-4-ol and 7-methyl-indan-4-ol, are already known (compare Journal of the Chemical Society (London) 1961, 2773–2779). According to the same method of working, a large number of differently substituted 4-hydroxy-indanes can be prepared. Thus, for example 1,2-dimethyl-indanole-(4) is obtained by rearranging α-halogen-α-methyl-butyric acid phenyl ester with aluminum chloride to give 1,2-dimethyl-4-hydroxy-indanone-(3), i.e. 1,2-dimethyl-indan-4-ol-3-on, and the ketone formed is converted into 1,2-dimethyl-indanole-(4), i.e. 1,2-dimethyl-indan-4-ol, by reduction or hydrogenation.

1,1-dimethyl-indanole-(4) is also known (compare U.S. Patent 3,057,929). The process for its preparation is particularly suitable for the preparation of 1,1-disubstituted indanoles-(4). Thus, for example 1,1,2 - trimethyl-indanole-(4) can be conveniently prepared in this manner.

Advantageously, the active compounds according to the present invention exhibit strong insecticidal and acaricidal effects, with low toxicity to warm-blooded animals and concomitantly low phytotoxicity. The effects set in rapidly and are long-lasting. The instant new compounds can therefore be used with good results for the control of noxious sucking and biting insects, Diptera and mites in the plant protection field and in hygiene and, in particular, because of their high stability to alkali, for the treatment of limed walls.

To the sucking insects contemplated herein there belong, in the main, aphids, such as the green peach aphid (*Myzus persicae*), the bean aphid (*Doralis fabae*); scales, such as *Aspidiotus hederae, Lecanium hesperidum, Pseudococcus maritimus;* Thysanoptera such as *Hercinothrips femoralis;* and bugs, such as the beet bug (*Poesma quadrata*), and the bed bug (*Climex lectularius*); and the like.

With the biting insects contemplated herein there are classed, in the main, butterfly caterpillars, such as *Plutella maculipennis, Lymantria dispar;* beetles, such as granary weevils (*Sitophilus granarius*), the Colorado bettle (*Leptinotarsa decemlineata*), and also species living in the soil, such as the wireworms (Agriotes sp.) and the larvae of the cockchafer (*Melolontha melolontha*); cockroaches, such as the German cockroach (*Blattella germanica*); Orthoptera, such as the house cricket (*Acheta domestica*); termites, such as Reticulitermes; and Hymenoptera, such as ants; and the like.

The Diptera contemplated herein comprise, in particular, the flies, such as the vinegar fly (*Drosophila melanogaster*), the Mediterranean fruit fly (*Ceratitis capitata*), the house fly (*Musca domestica*) and mosquitoes, such as the yellow fever mosquito (*Aedes aegypti*); and the like.

In the case of the mites contemplated herein, particularly important are the spider mites (Tetranychidae), as the two-spotted spider mite (*Tetranychus urticae*), the European red mite (*Panonychus ulmi*); gall mites, such as the current gall mite (*Eriophyes ribis*) and tarsonemids, such as *Tarsonemus pallidus;* and ticks; and the like.

The active compounds according to the present invention also exhibit bird-repellent properties and can therefore be used as repellents against destructive birds, such as anserine birds (Anseriformes), gallinaceous birds (Galliformes), charadruform birds (Charadriiformes), cuculine birds (Cuculiformes) and passerine birds (Passeriformes); and the like.

Finally, the instant active compounds also conveniently exhibit microbicidal properties.

The active compounds according to the instant invention can be utilized, if desired, in the form of the usual formulations or compositions with conventional inert pesticidal diluents or extenders, i.e. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides or bird-repellents, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.001–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.001–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular the present invention contemplates methods of selectively killing, combating or controlling pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particualr active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated without limitation by the following examples:

EXAMPLE 1

Plutella test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the given active compound preparation until dew moist and are then infested with caterpillars of the diamondback moth (*Plutella maculipennis*).

After the specified period of time, the degree of destruction is determined as a percentage: 100% means that all the caterpillars are killed whereas 0% means that none of the caterpillars are killed.

The particular active compounds tested, their concentrations, the evaluation time and the results obtained can be seen from the following Table 1:

TABLE 1
Plant-damaging insects

| Active compound | Concentration of active compound in percent | Degree of destruction in percent after 3 days |
|---|---|---|
| (A) 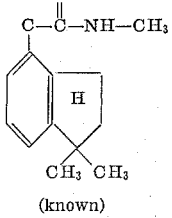 (known) | 0.02<br>0.002 | 100 |
| (2₁) 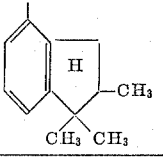 | 0.02<br>0.002 | 100<br>100 |

EXAMPLE 2

Phaedon larvae test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the given active compound preparation until dripping wet and then infested with mustard beetle larvae (*Phaedon cochleariae*).

After the specified period of time, the degree of destruction is determined as a percentage: 100% means that all the beetle larvae are killed; 0% means that none of the beetle larvae ar killed.

The particular active compounds tested, their concentrations, the evaluation time and the results obtained can be seen from the following Table 2.

TABLE 2
Plant-damaging insects

| Active compound | Concentration of active compound in percent | Degree of destruction in percent after 3 days |
|---|---|---|
| (A) 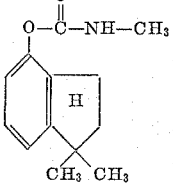 (known) | 0.002<br>0.0002 | 100<br>0 |
| (3₁) 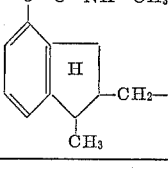 | 0.002<br>0.0002 | 100<br>90 |

EXAMPLE 3

Myzus test [contact action]

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage plants (*Brassica oleracea*) which have been heavily infested with peach aphids (*Myzus persicae*) are sprayed with the given active compound preparation until dripping wet.

After the specified period of time, the degree of destruction is determined as a percentage: 100% means that all the aphids are killed whereas 0% means that none of the aphids are killed.

The particular active compounds tested, their concentrations, the evaluation time and the results obtained can be seen from the following Table 3:

TABLE 3
Plant-damaging insects

| Active compound | Concentration of active compound in percent | Degree of destruction in percent after 24 hours |
|---|---|---|
| (A) (known) | 0.2<br>0.02 | 20<br>0 |
| ($4_1$) | 0.2<br>0.02<br>0.002 | 100<br>100<br>40 |
| ($5_1$) | 0.2<br>0.02 | 100<br>80 |
| ($6_1$) | 0.2<br>0.02<br>0.002 | 100<br>100<br>95 |

EXAMPLE 4

Doralis test [contact action]

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Vicea faba*) which have been heavily infested with the bean aphid (*Doralis fabae*) are sprayed with the given active compound preparation until dripping wet.

After the specified period of time, the degree of destruction is determined as a percentage; 100% means that all the aphids are killed; 0% means that none of the aphids are killed.

The particular active compounds tested, their concentrations, the evaluation time and the results obtained can be seen from the following Table 4.

TABLE 4
Plant-damaging insects

| Active compound | Concentration of active compound in percent | Degree of destruction in percent after 24 hours |
|---|---|---|
| (A) (known) | 0.2<br>0.02<br>0.002 | 100<br>98<br>0 |
| ($I_2$) | 0.2<br>0.02<br>0.002<br>0.0002 | 100<br>100<br>100<br>50 |
| ($7_1$) | 0.2<br>0.02<br>0.002 | 100<br>95<br>90 |

EXAMPLE 5

Tetranychus test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the given active compound preparation until dripping wet. These bean plants are heavily infested with spider mites (*Tetranychus urticae*) in all stages of development.

After the specified period of time, the effectiveness of the given active compound preparation is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 5:

TABLE 5
Plant-damaging mites

| Active compound | Concentration of active compound in percent | Degree of destruction in percent after 48 hours |
|---|---|---|
| (A) [structure: O-C(=O)-NH-CH₃ on benzene fused to cyclopentane with C(CH₃)₂ and H] (known) | 0.2 | 0 |
| (1₃) [structure: carbamate on indane with -CH₃ substituent] | 0.2 | 100 |
| (4₂) [structure with CH₃, CH₃ geminal on ring] | 0.2 | 100 |
| (6₂) [structure with CH₃ substituents] | 0.2 | 90 |

EXAMPLE 6

LD$_{100}$ test

Test creatures: *Sitophilus granarius*
Solvent: Acetone 2 parts by weight of the particular active compound are dissolved in 1000 parts by volume of the stated solvent. The solution so obtained is diluted with further solvent to the desired final concentration.

2.5 ml. of the given active compound solution are pipetted into a Petri dish. On the bottom of the Petri dish there is a filter paper having a diameter of about 9.5 cm. The Petri dish remains uncovered until the solvent has completely evaporated. The amount of active compound per square metre of filter paper varies with the concentration of the solution of active compound used. About 25 test creatures are then placed in the Petri dish and it is covered with a glass lid.

The condition of the test creatures is observed 1 day after the commencement of the experiment. The destruction is determined as a percentage.

The particular active compounds tested, their concentrations, and the results obtained can be seen from the following Table 6:

TABLE 6
LD$_{100}$ test

| Active compound | Concentration of active compound in solution in percent | Destruction in percent |
|---|---|---|
| (A) (known) | 0.2 | 50 |
| (1₄) | 0.2 | 100 |
|  | 0.02 | 100 |
|  | 0.002 | 70 |
| (5₂) | 0.2 | 100 |
|  | 0.02 | 100 |
|  | 0.002 | 50 |
| (3₂) | 0.2 | 100 |
|  | 0.02 | 100 |
|  | 0.002 | 100 |
| (4₃) | 0.2 | 100 |
|  | 0.02 | 100 |
| (6₃) | 0.2 | 100 |
|  | 0.02 | 100 |

EXAMPLE 7

Residual test.—Test creatures: *Musca domestica*

Wetting-powder base consisting of:

3% sodium diisobutylnaphtalene-1-sulfonate
6% sulfite waste liquor, partially condensed with aniline
40% highly dispersed silicic acid, containing CaO
51% colloidal kaolin.

To produce a suitable preparation of the particular active compound, 1 part by weight of such active compound is intimately mixed with 9 parts by weight of said wetting-powder base. The spray powder so obtained is suspended in 90 parts of water.

The given suspension of active compound is sprayed in an applied amount of 2 g. of active compound per square metre onto substrates of various materials.

The sprayed coatings are, at certain intervals, tested for their biological activity.

For this purpose, the test creatures are placed on the treated substrates. A squat cylinder is placed over the test creatures the top of which cylinder is closed with a wire gauze to prevent the creatures from escaping.

After 8 hours' residence period of the creatures on the substrate, the destruction of the test creatures is determined as a percentage.

The particular active compounds tested, the nature of the test substrates and the results obtained can be seen from the following Table 7:

TABLE 7
Residual-test
[Destruction of the test creatures in percent]

| Active compound | Test substrate | Age of the residual coating in— | | | | | |
|---|---|---|---|---|---|---|---|
| | | 1 week | 2 weeks | 4 weeks | 8 weeks | 10 weeks | 14 weeks |
| (A) 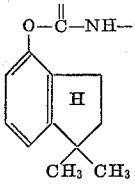 (known) | Clay | 90 | 90 | 10 | 20 | 0 | |
| | Clay freshly limed | 0 | | | | | |
| | Plywood | 95 | 70 | 50 | 30 | 0 | |
| ($1_5$) 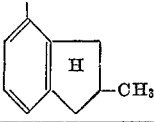 | Clay | 100 | 100 | 100 | 100 | 100 | 100 |
| | Clay freshly limed | 100 | 100 | 100 | 100 | 100 | 100 |
| | Plywood | 100 | 100 | 100 | 100 | 100 | 100 |

The process for producing the active compounds according to the present invention is illustrated, without limitation, by the following further examples:

EXAMPLE 8

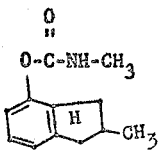

($1_6$)

20.7 g. 2-methyl-indan-4-ol are dissolved in 150 ml. benzine, and 9 ml. methyl-isocyanate and 3 drops of triethylamine are added. After 16 hours, the precipitated crystals are filtered off with suction and recrystallized from benzine/benzene. Yield: 23.1 g. of 2-methyl-indan-4-yl-N-methyl-carbamic acid ester, M.P.: 87–88° C.

EXAMPLE 9

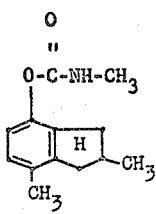

($6_4$)

5.4 g. 2,7-dimethyl-indan-4-ol are dissolved in 20 ml. petroleum ether and reacted with 1.7 ml. methyl-isocyanate in the presence of 1 drop of triethylamine to give the corresponding carbamate. The precipitated crystals are recrystallized from benzine. Yield: 4.25 g. of 2,7-dimethyl-indan-4-yl-N-methyl-carbamic acid ester. M.P.: 88–90° C.

(b) The 2,7-dimethyl-indan-4-ol is prepared as follows:
52.8 g. methacrylic acid p-cresyl ester are added dropwise to 44 g. AlCl₃, the temperature rising to 65° C. Heating to 130° C. is then effected for 1 hour, followed by cooling with ice and addition of water. The reaction mixture is distilled with steam, and the desired product comes over. After recrystallization from petroleum ether, 6 g. 2,4-dimethyl-7-hydroxy-indan-1-on, i.e. 2,7-dimethyl-4-hydroxy-indan-1-on or 2,7-dimethyl-indan-1-on-4-ol, of M.P. 46–47° C. are obtained.

6 g. 2,4-dimethyl-7-hydroxy-indan-1-on are boiled for 4 hours with 12 g. of amalgamated zinc and 150 ml. of 6 N hydrochloric acid. After extraction with methylene chloride is effected, the extracts are washed neutral, dried and evaporated. 5.4 g. of 2,7-dimethyl-indan-4-ol are obtained. M.P. 51–53° C.

EXAMPLE 10

(a)

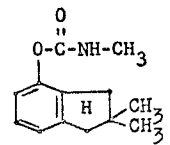

($4_3$)

2 g. 2,2-dimethyl-indan-4-ol are dissolved in 5 ml. petroleum ether; 1 drop of triethylamine and 0.8 ml. methylisocyanate are added. After heating at 40° C. has been effected for 1 hour, the mixture is allowed to cool. After a further hour, the crystals separate out and are filtered off with suction and, after recrystallization, melt at 90–91° C. Yield: 2.1 g. of 2,2-dimethyl-indan-4-yl-N-methyl-carbamic acid ester.

(b) The 2,2-dimethyl-indan-4-ol is prepared as follows:
67 g. 2-chloro-pivalic acid phenyl ester are heated to 120° C. with 120 g. AlCl₃. When the liberation of hydrochloric acid has ended, cooling is effected, followed by addition of water. After steam distillation, the dried distillate is fractionally distilled. A fraction is received between 100 and 120° C. which is then reduced by the method of Clemmensen. The fractional distillation of the reduced product yields a fraction which boils from 105–110° C. at 2.4 mm. Hg and is essentially 2,2-dimethyl-indan-4-ol. Yield: 2 g.

EXAMPLE 11

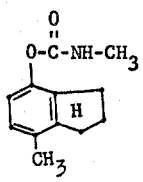

(7₂)

74 g. 7-methyl-indan-4-ol are dissolved hot in 360 ml. benzine, and 0.5 ml. triethylamine are added. After the solution has cooled to 40° C., 28.5 ml. methyl-isocyanate are added and the mixture is left to stand for 10 hours. Filtration and drying are then effected. Yield: 77.5 g. of 7-methyl-indan-4-yl-N - methyl - carbamic acid ester; M.P. 118.5° C.

EXAMPLE 12

(a)

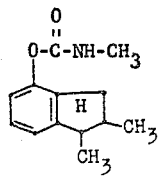

(5₃)

11.0 g. 1,2-dimethyl-indan-4-ol are dissolved in 100 ml. benzine and 20 ml. benzene; one drop of triethylamine and 4.5 ml. methyl-isocyanate are added. The mixture is left to stand overnight and then cooled in an ice bath. The substance so obtained is recrystallized from benzine/benzene mixture. Yield: 10.4 g. of 1,2-dimethyl-indan-4-yl-N-methyl-carbamic acid ester. M.P. 108.5–109° C.

(b) The 1,2-dimethyl-indan-4-ol is obtained by Clemmensen reduction of the 2,3-dimethyl-7-hydroxy-indan-1-on obtainable from 2-methyl-2-bromo-butyric acid phenyl ester by treatment with AlCl₃ in a manner analogous to the procedure of Example 10(b). M.P.: 86–87° C.

EXAMPLE 13

(a)

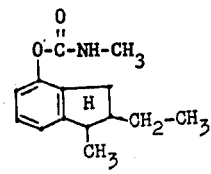

(3₃)

3 drops of triethylamine are added to a solution of 17.9 g. 1-methyl-2-ethyl-indan-4-ol and 6.5 ml. methyl-isocyanate in 85 ml. benzine. The mixture heats up to 40° C. After 2 hours, crystallization begins. After crystallization has ended, suction filtration is effected and the product is recrystallized from benzine/benzene. Yield: 20.8 g. of 1-methyl-2-ethyl-indan-4-yl-N-methyl-carbamic acid ester. M.P. 125–126° C.

(b) The 1-methyl-2-ethyl-indan-4-ol is obtained as follows:

227.5 g. 1,1-diethyl-1-bromo-acetic acid p-chlorophenyl ester are slowly heated to 130 to 140° C. with 200 g. AlCl₃ and kept at this temperature for 2 hours. After cooling, decomposition with water, with ice cooling, is effected, and then distillation with steam. After working up of the steam distillate, 105.5 g. of crude 2-ethyl-3-methyl-4-chloro-7-hydroxy-indan-1-on are obtained.

105.5 g of crude 2-ethyl-3-methyl-4-chloro-7-hydroxy-indan-1-on are boiled for 4 hours with 210 g. of amalgamated zinc and 1500 ml. 6 N hydrochloric acid. After extraction with methylene chloride, neutralization and evaporation, 99.2 g. of product are obtained which are dissolved in 175 ml. of a 20% solution of sodium hydroxide and hydrogenated in the presence of 5 g. of Raney nickel. After working up and fractionation and recrystallization, 17.9 g. 1-methyl-2-ethyl-indan-4-ol are obtained. B.P. 93–97° C./0.6 mm. Hg; M.P. 50.5–51.5° C.

EXAMPLE 14

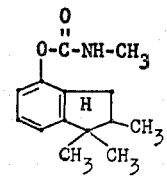

(2₂)

98 g. 1,1,2-trimethyl-indan-4-ol are dissolved in 250 ml. benzine and 100 ml. benzene, 0.5 ml. triethylamine and 35 ml. methyl-isocyanate are added, and the mixture is left to stand at room temperature until crystallization has ended. After recrystallization of the separated product, 124.2 g. of product of M.P. 144.5–145° C. are obtained, i.e. 1,1,2-trimethyl-indan-4-yl-N-methyl-carbamic acid ester.

It will be realized that all of the foregoing compounds contemplated by the present invention possess the desired selective pesticidal, especially arthropodicidal, i.e. insecticidal or acaricidal, properties for combating insects and acarids, as well as the desired bird-repellent properties, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A 2-methyl-indan-4-yl-N-methyl-carbamic acid ester of the formula

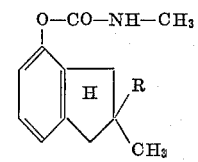

in which R is selected from the group consisting of methyl and hydrogen.

2. Compound according to claim 1 wherein such compound is 2-methyl-indan-4-yl-N-methyl-carbamic acid ester of the formula

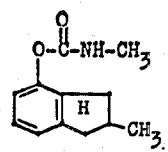

3. Compound according to claim 1 wherein such compound is 2,2-dimethyl-indan-4-yl-N-methyl-carbamic acid ester of the formula
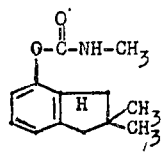
References Cited
UNITED STATES PATENTS
2,870,057  1/1959  Hartle et al. _____ 260—479
FOREIGN PATENTS
1,249,261  9/1967  Germany _____ 260—479
JAMES A. PATTEN, Primary Examiner
U.S. Cl. X.R.
260—590, 623 R, 624 R; 424—300

UNITED STATES PATENT OFFICE
CERTIFICATE OF CORRECTION

Patent No. 3,712,915        Dated January 23, 1973

Inventor(s) Alfred Seyberlich et. al.

It is certified that error appears in the above-identified patent and that said Letters Patent are hereby corrected as shown below:

Column 1, line 16, change "monoto" to -- mono to -- .

Column 3, line 50, correct spelling of "Piesma".

Column 3, line 51, correct spelling of "Cimex".

Column 3, line 72, insert -- such -- before "as".

Column 5, line 34, correct spelling of "particular".

Column 6, line 46, change "ar" to -- are -- .

Column 6, line 8, Compound (A), last column of table, insert -- 30 -- under "100".

Column 7, line 40, first line of Compound ($4_1$) change

Column 8, line 3, correct spelling of "Vicia".

Signed and sealed this 29th day of May 1973.

(SEAL)
Attest:

EDWARD M. FLETCHER, JR.        ROBERT GOTTSCHALK
Attesting Officer              Commissioner of Patents